United States Patent
Doll et al.

(10) Patent No.: US 11,312,814 B2
(45) Date of Patent: Apr. 26, 2022

(54) SOLID ROCKET PROPELLANT WITH LOW GLASS TRANSITION

(71) Applicant: Aerojet Rocketdyne, Inc., Sacramento, CA (US)

(72) Inventors: Daniel Doll, Orange, VA (US); Scott Dawley, Culpeper, VA (US)

(73) Assignee: AEROJET ROCKETDYNE, INC., Orange, VA (US)

( * ) Notice: Subject to any disclaimer, the term of this patent is extended or adjusted under 35 U.S.C. 154(b) by 929 days.

(21) Appl. No.: 15/762,745

(22) PCT Filed: Sep. 30, 2016

(86) PCT No.: PCT/US2016/054681
§ 371 (c)(1),
(2) Date: Mar. 23, 2018

(87) PCT Pub. No.: WO2017/069926
PCT Pub. Date: Apr. 27, 2017

(65) Prior Publication Data
US 2018/0215860 A1    Aug. 2, 2018

Related U.S. Application Data

(60) Provisional application No. 62/243,614, filed on Oct. 19, 2015.

(51) Int. Cl.
*C08G 18/62*    (2006.01)
*C08G 18/10*    (2006.01)
(Continued)

(52) U.S. Cl.
CPC .......... *C08G 18/6204* (2013.01); *C06B 23/00* (2013.01); *C06B 45/10* (2013.01); *C08G 18/10* (2013.01); *C08G 18/3812* (2013.01); *C08G 18/48* (2013.01); *C08G 18/4854* (2013.01); *C08G 18/61* (2013.01); *C08G 18/771* (2013.01);
(Continued)

(58) Field of Classification Search
None
See application file for complete search history.

(56) References Cited

U.S. PATENT DOCUMENTS

| | | | |
|---|---|---|---|
| 4,332,631 A | 6/1982 | Herty, III et al. | |
| 4,463,155 A * | 7/1984 | Kibler | C08G 18/10 528/60 |

(Continued)

FOREIGN PATENT DOCUMENTS

| | | |
|---|---|---|
| EP | 0192190 | 8/1986 |
| EP | 0266973 | 5/1988 |

(Continued)

OTHER PUBLICATIONS

International Preliminary Report on Patentability for International Patent Application No. PCT/US2016/054681, dated May 3, 2018.
International Search Report and Written Opinion for PCT Application No. PCT/US2016/054681 completed Dec. 16, 2016.

*Primary Examiner* — Aileen B Felton

(57) ABSTRACT

A solid rocket propellant includes a binder that has hydroxyl-terminated polybudadiene (HTPB) with a curative that is selected from isocyanate-terminated polyether, isocyanate-terminated polysiloxane, or combinations thereof.

13 Claims, 1 Drawing Sheet

(51) Int. Cl.
  *C06B 45/10*    (2006.01)
  *C08L 83/08*    (2006.01)
  *C08G 18/61*    (2006.01)
  *C08G 18/38*    (2006.01)
  *C08G 18/48*    (2006.01)
  *C06B 23/00*    (2006.01)
  *C08G 18/77*    (2006.01)
  *F02K 9/08*    (2006.01)
  *F02K 9/97*    (2006.01)

(52) U.S. Cl.
  CPC ......... *C08G 18/773* (2013.01); *C08G 18/778* (2013.01); *C08L 83/08* (2013.01); *F02K 9/08* (2013.01); *F02K 9/97* (2013.01)

(56) References Cited

U.S. PATENT DOCUMENTS 5,417,895 A * 5/1995 Oberth ............... C06B 21/0025
                       149/19.1
8,334,356 B1   12/2012   Nowak et al.

FOREIGN PATENT DOCUMENTS

| | | |
|---|---|---|
| EP | 0520104 | 12/1992 |
| EP | 1219652 | 7/2002 |
| EP | 2253650 | 11/2010 |
| GB | 1061390 | 3/1967 |
| WO | 0034350 | 6/2000 |

* cited by examiner

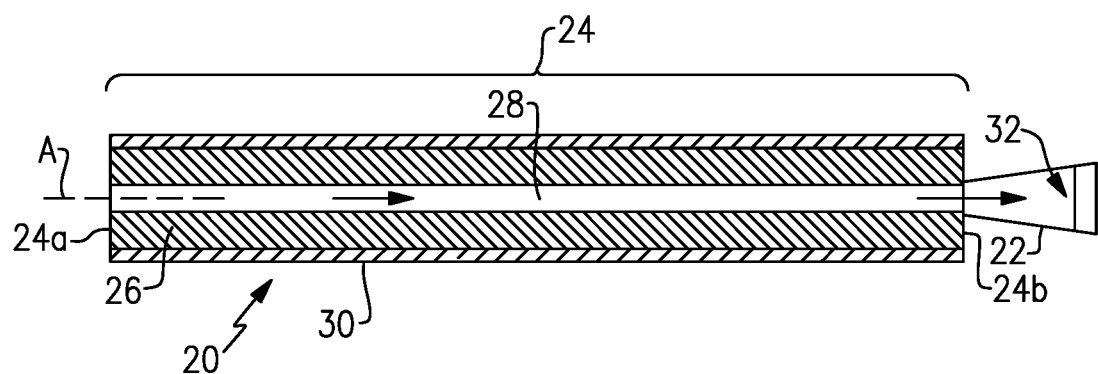

SOLID ROCKET PROPELLANT WITH LOW GLASS TRANSITION

CROSS-REFERENCE TO RELATED APPLICATIONS

The present disclosure claims priority to U.S. Provisional Patent Application No. 62/243,614, filed Oct. 19, 2015.

BACKGROUND

Solid rocket motors typically include a cast solid propellant. Solid propellant may include oxidizer, fuel, or both, held together with a binder. Ignition of the solid propellant generates high pressure gas, which is expelled through a nozzle to generate thrust.

SUMMARY

A solid rocket propellant according to an example of the present disclosure includes a binder having hydroxyl-terminated polybudadiene (HTPB) with a curative selected from the group consisting of isocyanate-terminated polyether, isocyanate-terminated polysiloxane, and combinations thereof.

In a further embodiment of any of the foregoing embodiments, the curative is the isocyanate-terminated polyether.

In a further embodiment of any of the foregoing embodiments, the isocyanate-terminated polyether is diisocyanate-terminated polyether.

In a further embodiment of any of the foregoing embodiments, the diisocyanate-terminated polyether is fluorinated.

In a further embodiment of any of the foregoing embodiments, the diisocyanate-terminated polyether is hexamethylene diisocyanate-terminated perfluoro-3,6,9-trioxaundecane-1,11-diol (FODI).

In a further embodiment of any of the foregoing embodiments, the diisocyanate-terminated polyether is hexamethylene diisocyanate-terminated polytetrahydrofuran (pTHF).

In a further embodiment of any of the foregoing embodiments, the curative is the isocyanate-terminated polysiloxane.

In a further embodiment of any of the foregoing embodiments, the isocyanate-terminated polysiloxane is diisocyanate-terminated polysiloxane.

In a further embodiment of any of the foregoing embodiments, the isocyanate is aliphatic diisocyanate.

In a further embodiment of any of the foregoing embodiments, the isocyanate is hexamethylene diisocyanate.

In a further embodiment of any of the foregoing embodiments, the binder has a ratio of the curative to the HTPB, by weight, of about 5:95 to about 40:60.

In a further embodiment of any of the foregoing embodiments, the curative is hexamethylene diisocyanate-terminated polyether, and the binder has a ratio of the curative to the HTPB, by weight, of about 5:95 to about 40:60.

In a further embodiment of any of the foregoing embodiments, the curative is diisocyanate-terminated polysiloxane, and the binder has a ratio of the curative to the HTPB, by weight, of about 5:95 to about 40:60.

A solid rocket motor according to an example of the present disclosure includes a motor case, a nozzle attached with the motor case, and a solid rocket propellant disposed in the motor case. The solid rocket propellant has a hydroxyl-terminated polybudadiene (HTPB) with a curative selected from the group consisting of isocyanate-terminated polyether, isocyanate-terminated polysiloxane, and combinations thereof.

In a further embodiment of any of the foregoing embodiments, the curative is diisocyanate-terminated polyether.

In a further embodiment of any of the foregoing embodiments, the diisocyanate-terminated polyether is selected from the group consisting of hexamethylene diisocyanate-terminated perfluoro-3,6,9-trioxaundecane-1,11-diol (FODI) and hexamethylene diisocyanate-terminated polytetrahydrofuran (pTHF).

In a further embodiment of any of the foregoing embodiments, the curative is diisocyanate-terminated polysiloxane.

In a further embodiment of any of the foregoing embodiments, the binder has a ratio of the curative to the HTPB, by weight, of about 5:95 to about 40:60.

A polymer composition according to an example of the present disclosure includes a hydroxyl-terminated polybudadiene (HTPB) with a curative selected from the group consisting of isocyanate-terminated polyether, isocyanate-terminated polysiloxane, and combinations thereof.

In a further embodiment of any of the foregoing embodiments, the curative is selected from the group consisting of hexamethylene diisocyanate-terminated perfluoro-3,6,9-trioxaundecane-1,11-diol (FODI) and hexamethylene diisocyanate-terminated polytetrahydrofuran (pTHF), and the binder has a ratio of the curative to the HTPB, by weight, of about 5:95 to about 40:60.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example solid rocket motor.

DETAILED DESCRIPTION

FIG. 1 schematically illustrates a cross-section of selected portions of an example solid rocket motor 20, which is also an example of an energetic device. The solid rocket motor 20 generally includes a nozzle 22 and a solid propellant section 24. The solid propellant section 24 includes a forward end 24a and an aft end 24b. The nozzle 22 is attached at the aft end 24b. As will be appreciated, the solid rocket motor 20 may include additional components related to the operation thereof, which are generally known and thus not described herein.

The solid propellant section 24 includes a solid propellant 26. Solid propellants may include at least a polymer-based binder and an oxidizer. Depending on the requirements of a particular design, a solid propellant may also include a solid fuel. In this example, the solid propellant 26 defines an elongated bore 28. The geometry of the bore 28 may be cylindrical and may have radial fin slots or other features. Alternatively, the solid propellant 26 may not have a bore. The solid propellant 26 is disposed within a motor case 30 about a central axis A.

Upon ignition the solid propellant 26 reacts to produce high temperature and high pressure gas (combustion gas). The combustion gas flows down the bore 28 and discharges through the nozzle 22 to produce thrust.

Prior to use for producing thrust, the motor 20 may be in storage or may be transported. During storage or transport the motor may be subject to the ambient surrounding environmental conditions, which may include a wide range of temperature. In particular, at very low temperatures a polymer-based binder may begin to approach its glass transition temperature ($T_g$). Below the $T_g$ the polymer may become brittle and less tolerant to strain, and there is thus an increased potential that stresses on a rocket motor will cause cracking of the binder at very low temperatures. While lower glass transition temperatures for such polymer binders would be desired to reduce the potential for strain intolerance, the solid propellant must also be manufacturable and provide good thrust performance. In this regard, as will be discussed in further detail below, the solid propellant 26 includes a binder that has good performance and enhanced low $T_g$.

The solid propellant 26 disclosed herein includes a binder that has hydroxyl-terminated polybudadiene (HTPB) with a curative that is selected from isocyanate-terminated polyether, isocyanate-terminated polysiloxane, diisocyanate-terminated polyether that is hexamethylene diisocyanate-terminated perfluoro-3,6,9-trioxaundecane-1,11-diol (FODI), or combinations thereof. The selected curative serves to lower the $T_g$ of the binder, thus enhancing the low temperature strain tolerance of the solid propellant 26.

In one example, the curative is the isocyanate-terminated polyether. For instance, the isocyanate-terminated polyether is diisocyanate-terminated polyether and may be fluorinated. One example of a fluorinated diisocyanate-terminated polyether is hexamethylene diisocyanate-terminated perfluoro-3,6,9-trioxaundecane-1,11-diol (FODI). In another example, the diisocyanate-terminated polyether is hexamethylene diisocyanate-terminated polytetrahydrofuran (pTHF).

Additionally or alternatively, the curative may be or may include the isocyanate-terminated polysiloxane. For instance, the isocyanate-terminated polysiloxane may be diisocyanate-terminated polysiloxane.

The binder of the solid propellant 26 has a ratio of the curative to the HTPB, by weight, of about 5:95 to about 40:60. The above ratio may be effective to achieve a $T_g$ of lower than approximately −80° C., such equal to or below −85° C. In further examples, a $T_g$ of about −88° C. can be obtained using FODI, and a $T_g$ of about −85° C. can be obtained using pTHF.

The motor 20 may be fabricated by injecting or casting the solid propellant 26 in the case 30. For instance, the constituents of the solid propellant 26 are mixed together and then injected or poured into the case or an appropriate mold. The mixture then cures, thus producing the final solid propellant 26 in the desired geometry. As an example, the solid propellant 26 may include the binder disclosed herein and an oxidizer. Depending on the design of the motor 20, the solid propellant 26 may also include a solid fuel, such as one or more powders of aluminum, boron, or magnesium. Typically, these constituents, excluding the curative, will be mixed together. The curative may be added last to the mixture to prevent premature curing. The mixture is then poured into the case 30 or an appropriate mold to form the solid propellant 26. The curative reacts with the hydroxyl groups of the HTPB to form crosslinks, which serve to make the binder elastic.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A solid rocket propellant comprising a binder having hydroxyl-terminated polybudadiene (HTPB) with a curative that includes isocyanate-terminated polyether that is hexamethylene diisocyanate-terminated polytetrahydrofuran (pTHF).

2. The solid rocket propellant as recited in claim 1, wherein the curative additionally includes isocyanate-terminated polysiloxane.

3. The solid rocket propellant as recited in claim 2, wherein the isocyanate-terminated polysiloxane is diisocyanate-terminated polysiloxane.

4. The solid rocket propellant as recited in claim 1, wherein the binder has a ratio of the curative to the HTPB, by weight, of about 5:95 to about 40:60.

5. The solid rocket propellant as recited in claim 1, wherein the curative additionally includes diisocyanate-terminated polysiloxane, and the binder has a ratio of the curative to the HTPB, by weight, of about 5:95 to about 40:60.

6. A solid rocket motor comprising:
   a motor case;
   a nozzle attached with the motor case; and
   a solid rocket propellant disposed in the motor case, the solid rocket propellant including a hydroxyl-terminated polybudadiene (HTPB) with a curative that includes isocyanate-terminated polyether that is hexamethylene diisocyanate-terminated polytetrahydrofuran (pTHF).

7. The solid rocket motor as recited in claim 6, wherein the curative additionally includes diisocyanate-terminated polysiloxane.

8. The solid rocket motor as recited in claim 6, wherein the binder has a ratio of the curative to the HTPB, by weight, of about 5:95 to about 40:60.

9. A polymer composition comprising a hydroxyl-terminated polybudadiene (HTPB) with a curative that includes isocyanate-terminated polyether that is hexamethylene diisocyanate-terminated polytetrahydrofuran (pTHF).

10. The polymer composition as recited in claim 9, wherein the binder has a ratio of the curative to the HTPB, by weight, of about 5:95 to about 40:60.

11. The solid rocket motor as recited in claim 6, wherein the curative additionally includes diisocyanate-terminated polysiloxane, and the binder has a ratio of the curative to the HTPB, by weight, of about 5:95 to about 40:60.

12. The polymer composition as recited in claim 9, wherein the curative additionally includes diisocyanate-terminated polysiloxane, and the binder has a ratio of the curative to the HTPB, by weight, of about 5:95 to about 40:60.

13. The solid rocket propellant as recited in claim 1, wherein the binder has a glass transition temperature ($T_g$) of lower than −80° C..

* * * * *